United States Patent
Lescher et al.

(10) Patent No.: US 10,578,031 B2
(45) Date of Patent: Mar. 3, 2020

(54) METHOD FOR DETECTING A FAILURE OF A FIRST TURBINE ENGINE OF A TWIN-ENGINE HELICOPTER AND FOR OPERATING THE SECOND TURBINE ENGINE, AND CORRESPONDING DEVICE

(71) Applicant: SAFRAN HELICOPTER ENGINES, Bordes (FR)

(72) Inventors: Fabien Lescher, Aressy (FR); Jean Philippe Jacques Marin, Jurancon (FR); Philippe Etchepare, Pau (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 685 days.

(21) Appl. No.: 15/128,090

(22) PCT Filed: Mar. 20, 2015

(86) PCT No.: PCT/FR2015/050697
§ 371 (c)(1),
(2) Date: Sep. 21, 2016

(87) PCT Pub. No.: WO2015/145041
PCT Pub. Date: Oct. 1, 2015

(65) Prior Publication Data
US 2017/0101938 A1     Apr. 13, 2017

(30) Foreign Application Priority Data
Mar. 27, 2014   (FR) ...................... 14 52642

(51) Int. Cl.
*F02C 9/56*    (2006.01)
*F02K 3/12*    (2006.01)
(Continued)

(52) U.S. Cl.
CPC ............... *F02C 9/56* (2013.01); *B64D 31/06* (2013.01); *F02C 3/10* (2013.01); *F02C 9/46* (2013.01);
(Continued)

(58) Field of Classification Search
CPC ...... F02C 9/28; F02C 9/46; F02C 9/56; F02C 3/10; B64D 31/06; F02K 3/12;
(Continued)

(56) References Cited

U.S. PATENT DOCUMENTS 3,982,389 A * 9/1976 Maker .................. F02C 9/32
                                                      60/791
4,500,966 A   2/1985 Zagranski et al.
(Continued)

FOREIGN PATENT DOCUMENTS

AU          657575        3/1995
WO       WO-9410619      5/1994

OTHER PUBLICATIONS

International Search Report with English Language Translation, dated Jun. 5, 2015, PCT Application No. PCT/FR2015/050697.

*Primary Examiner* — Mark A Laurenzi
*Assistant Examiner* — Loren C Edwards
(74) *Attorney, Agent, or Firm* — Womble Bond Dickinson (US) LLP

(57) ABSTRACT

The invention relates to a method for detecting a malfunction in a first turboshaft engine, referred to as an inoperative engine (4), of a twin-engine helicopter, and for controlling a second turboshaft engine, referred to as a healthy engine (5), each engine (4, 5) comprising protective stops regulated by a regulation device which define a maximum power regime, characterised in that it comprises: a step (10) of detecting an indication of failure of said inoperative engine (4); a step (11) of modifying said protective stops of said healthy engine (5) into protective stops which correspond to a maximum power single-engine regime, in the case of the detected indication of failure; a step (12) of confirming a failure of said inoperative engine (4); a step (13) of controlling an increase in the flow rate of fuel supply of said healthy engine (5), in the event of a confirmed failure.

10 Claims, 1 Drawing Sheet

Figure 1:
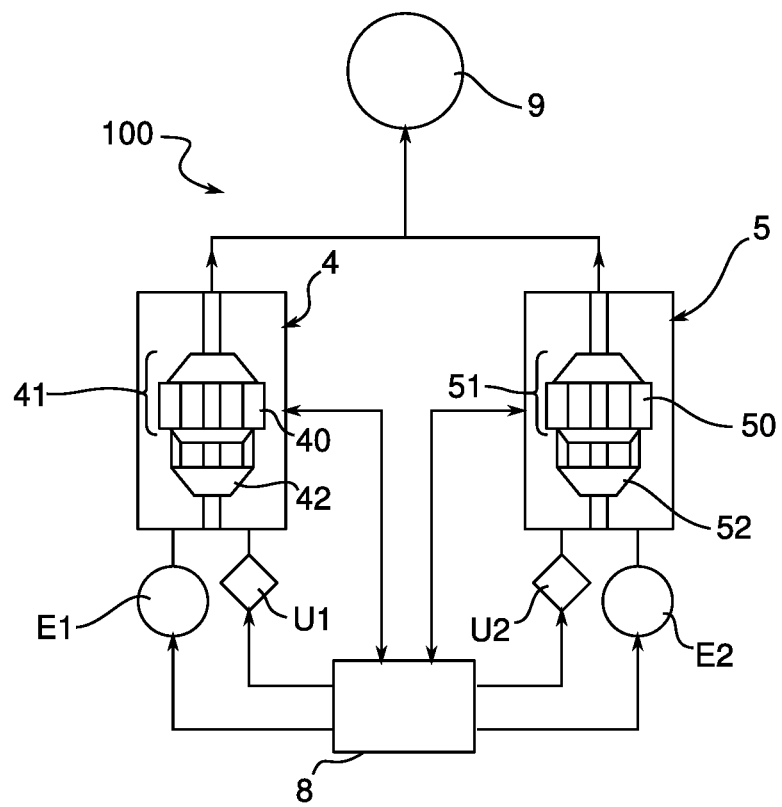

(51) Int. Cl.
 *F02C 3/10* (2006.01)
 *F02C 9/46* (2006.01)
 *B64D 31/06* (2006.01)

(52) U.S. Cl.
 CPC .......... *F02K 3/12* (2013.01); *F05D 2220/329* (2013.01); *F05D 2270/091* (2013.01); *F05D 2270/093* (2013.01); *F05D 2270/095* (2013.01); *F05D 2270/335* (2013.01); *Y02T 50/671* (2013.01)

(58) Field of Classification Search
 CPC ......... F05D 2220/329; F05D 2270/091; F05D 2270/093; F05D 2270/095; F05D 2270/335; Y02T 50/671
 USPC .......................................................... 60/773
 See application file for complete search history.

(56) References Cited

U.S. PATENT DOCUMENTS 5,363,317 A * 11/1994 Rice ..................... B64D 31/12
 701/100
2013/0184903 A1 7/2013 Evrard et al.

\* cited by examiner

METHOD FOR DETECTING A FAILURE OF A FIRST TURBINE ENGINE OF A TWIN-ENGINE HELICOPTER AND FOR OPERATING THE SECOND TURBINE ENGINE, AND CORRESPONDING DEVICE

1. TECHNICAL FIELD OF THE INVENTION

The invention relates to a method for regulating the turboshaft engines of a twin-engine helicopter. In particular, the invention relates to a method for detecting a malfunction of a first turboshaft engine, referred to as an inoperative engine, of a twin-engine helicopter, and for controlling the second turboshaft engine, referred to as a healthy engine. The invention also relates to a device for detecting a malfunction of a first turboshaft engine and for controlling a second turboshaft engine of a twin-engine helicopter.

2. TECHNICAL BACKGROUND

A twin-engine helicopter is equipped with two turboshaft engines which operate in regimes which are dependent on the flight conditions of the helicopter. It is known that a twin-engine helicopter can have two main regimes, a regime known by the abbreviation AEO (all engines operative) in which the two turboshaft engines operate normally in predetermined regimes, and a regime known by the abbreviation OEI (one engine inoperative) in which one of the turboshaft engines is inoperative. This OEI regime occurs following the loss of one engine. When this event occurs, it is necessary for the good engine to accelerate rapidly so that it can provide the maximum permissible power thereof in an emergency situation and thus make it possible for the helicopter to cope with the perilous situation, then to be able to continue the flight.

Throughout the following text, the malfunctioning turboshaft engine will be referred to by the term "inoperative turboshaft engine" and the good engine will be referred to by the term "healthy turboshaft engine".

The technical problem is thus posed of minimising the period which separates the detection of the sudden loss of power of the inoperative turboshaft engine and achieving maximum power in the emergency regime of the healthy turboshaft engine.

The shorter this period, the safer the flight is. Furthermore, the shorter this period, the more the helicopter can have a significant take-off mass. Minimising the period which separates the detection of the loss of power of the inoperative engine from achieving the full power of the healthy engine is thus beneficial in two ways.

Nowadays, it is known to detect the loss of power of the inoperative engine by comparing the operating regimes of the two turboshaft engines. If a predetermined difference between the two operating regimes is detected, the turboshaft engine having the worse regime is declared to be inoperative. This loss of power is detected by the identification of a difference between the speeds of the gas turbines which is greater than a predetermined threshold or a difference between the torques of the two engines which is greater than a predetermined threshold.

Once the loss of power is detected, the healthy engine is controlled in order to reach the maximum regime thereof in the emergency regime, which consists in increasing the maximum torque and speed stops of the gas turbine to the maximum permissible stops. Subsequently, the fall in the rotational speed of the rotary wing of the helicopter following the loss of the inoperative engine will lead, by means of the regulation of the speed of the rotary wing by the healthy engine, to an increase in the setpoint value of the fuel flow rate.

The technical problem is posed of providing a better solution to further minimise the period which separates the detection of the sudden loss of power of the inoperative turboshaft engine and achieving maximum power in the emergency regime of the healthy turboshaft engine.

3. AIMS OF THE INVENTION

The invention aims to provide an effective and economical solution to this technical problem.

In particular, the invention aims to provide, in at least one embodiment of the invention, a method for detecting a malfunction of a first turboshaft engine, referred to as an inoperative engine, of a twin-engine helicopter, and for controlling the second turboshaft engine, referred to as a healthy engine, which minimises the period which separates the detection of the malfunction of the inoperative engine from achieving the full power of the healthy engine.

The invention also aims to provide a device for detecting a malfunction of a first, inoperative turboshaft engine of a twin-engine helicopter, and for controlling the second, healthy turboshaft engine.

The invention also aims to provide a twin-engine helicopter which is equipped with such a device.

4. SUMMARY OF THE INVENTION

For this purpose, the invention relates to a method for detecting a malfunction in a first turboshaft engine, referred to as an inoperative engine, of a twin-engine helicopter having a rotary wing, and for controlling a second turboshaft engine, referred to as a healthy engine, each engine comprising protective stops regulated by a regulation device which define a maximum power regime, characterised in that it comprises:
  a step of detecting an indication of failure of said inoperative engine,
  a step of modifying said protective stops of said healthy engine into protective stops which correspond to a single-engine regime, in the case of the detected indication of failure,
  a step of confirming a failure of said inoperative engine,
  a step of controlling an immediate increase in the flow rate of fuel supply of said healthy engine, in the event of a confirmed failure, so as to allow an acceleration of the healthy engine without waiting for an automatic regulation of the healthy engine after a fall in speed of said rotary wing resulting from the failure of the inoperative engine.

A method according to the invention thus makes it possible to switch the healthy engine from a twin-engine configuration to a single-engine configuration once an indication of failure is detected. This step of changing configuration is carried out by modifying the protective steps of the engine into protective steps which correspond to the single-engine regime. A subsequent step of confirming failure is then implemented and influences the control of the immediate increase of the flow rate of fuel supply of the healthy engine. This step of confirming failure makes it possible to ensure that the helicopter is actually facing a real loss of power, and this avoids ordering an untimely acceleration of the healthy engine, which can otherwise cause overspeed of the rotor. If the failure is confirmed, the fuel flow rate of the healthy engine is immediately increased, and this makes it possible to rapidly accelerate the healthy engine without waiting for an automatic regulation following the fall in the rotational speed of the rotary wing of the helicopter.

A method according to the invention thus makes it possible to rapidly detect a failure of an engine and to rapidly achieve the full power of the healthy engine after the detection of the failure. Once an indication of failure is detected, the protections of the healthy engine are modified and increased to the protective stops which correspond to the single-engine regime. If the failure is confirmed, the fuel setpoint value is modified. Since the healthy engine is then at full acceleration, as a result of the increase in the protective stops, full power in the single-engine regime is reached rapidly.

A method according to the invention has phases for detecting the failure of the inoperative engine and for controlling the healthy engine which overlap one another, and this makes it possible to shorten the period between the detection of the malfunction of said inoperative engine and obtaining the full power of said healthy engine.

In a known manner, each turboshaft engine comprises a gas generator provided with a combustion chamber, a free turbine which is supplied with gas by the gas generator, and an output shaft which is set into rotation by the free turbine. The protective stops of each engine, which define the maximum power regime of said engine, typically correspond to levels of speed of the gas generator, of engine torque and/or of temperature of the combustion chamber. These protective stops are regulated by a regulation device known by the abbreviation FADEC (full authority digital engine control). The step of modifying the protective steps makes it possible to modify, and in practice to increase, the maximum permissible limits of these different parameters—speed of the gas generator, engine torque, temperature of the combustion chamber. These stops pass from the levels thereof which correspond to a twin-engine operation to the levels thereof which correspond to a single-engine operation.

Advantageously and according to the invention, the step of detecting an indication of failure consists in:
  retrieving, for each engine, at least one measurement of at least one parameter which is representative of the operating regime of the engines,
  detecting a difference between said measurements which is greater, in terms of absolute value, than a predetermined threshold.

This step makes it possible to retrieve measurements of at least one parameter which is representative of the operating regime of each engine and to detect a difference between these measurements which is greater, in terms of absolute value, than a predetermined threshold. Such a parameter which is representative of the operating regime of the engines can be a measured parameter or an estimated parameter. Said parameter can be for example the rotational speed of the gas turbine of each engine, or the torque exerted by an output shaft of each turboshaft engine which sets into motion a power transmission case, or the temperature of the gases at the input of the free turbine of each turboshaft engine, or the estimation of the level of dose rate, etc.

Advantageously and according to this variant, each detection of a difference between said measurements is modulated by at least one variable, referred to as a modulation variable, which is representative of normal variations in said measurements during a nominal operating regime of the engines.

According to this advantageous variant, each measurement of a difference is modulated by a modulation variable which makes it possible to take into account the normal variations in the measurements during a nominal operating regime. This thus makes it possible to avoid the untimely detections of failure which in reality are due to normal variations in the measurements. These modulation variables thus make it possible to integrate the normal variations in the measurements and thus reduce the threshold above which a difference must be considered to be an indication of failure.

Advantageously and according to this variant, at least one modulation variable is selected from the following group: type of engine regimes; type of effective balancing of the engines; proximity of the measurements of the shaft and torque speeds of the engines to the maximum permissible values for said engines; acceleration and deceleration rates of the engines; period of transmission of said measurements of each parameter which is representative of the operating regime of the engines.

Each of these modulation variables makes it possible to take into account, when determining a difference between the measurements of a parameter which is representative of the operating regime of the engines, conditions in which the measurement has been carried out, and thus to modulate the measurement of the difference.

Advantageously, in a variant or in combination, a method according to the invention further comprises a step of learning nominal differences between said measurements of at least one parameter which is representative of the operating regime of the engines, during stabilised regimes of said engines, said nominal differences which are determined in this way constituting a modulation variable.

A learning step of this type makes it possible to create a learning base which supplies differences between the measurements of a parameter which is representative of the operating regime of the engines, which are not representative of a failure of one of the engines. This learning base also supplies normal differences in normal operating conditions. In other words, this learning base makes it possible to refine the detection threshold above which a difference must be considered to be an indication of failure.

Advantageously and according to the invention, at least one parameter which is representative of the operating regime of an engine is a rotational speed of said gas generator or a torque which is exerted by said output shaft of said engine.

According to this advantageous variant, the step of detecting an indication of failure consists in comparing the values of the speeds of the gas turbines and/or the torques exerted by the output shafts.

Advantageously and according to the invention, the step of modifying the protective stops of said healthy engine into protective stops which correspond to a single-engine regime consists in increasing the torque exerted by said output shaft and in increasing the rotational speed of said gas generator in order to achieve predetermined rated values which correspond to a full-power single-engine regime.

Advantageously and according to the invention, the step of confirming a failure of said first engine consists in verifying that multiple predetermined conditions which are representative of a real loss of power are verified.

Advantageously and according to this variant, said predetermined conditions are as follows:
  a signed difference between the rotational speed of said gas generator of said inoperative engine and the rotational speed of said gas generator of said healthy engine is greater than the difference measured in said step of detecting an index for this parameter,
  a signed difference between the torque of said output shaft of said inoperative engine and the torque of said output shaft of said healthy engine is greater than the difference measured in said step of detecting an index, a rotational speed of said free turbine of said inoperative engine is less than a predetermined setpoint value which is subtracted from a predetermined offset, a time derivative of the rotational speed of said gas generator of said healthy engine is greater than a predetermined threshold, a time derivative of the rotational speed of said gas generator of said inoperative engine is less than a predetermined threshold.

All of the above-mentioned predetermined conditions make it possible to confirm the failure of said inoperative engine. In other words, it makes it possible to differentiate between a real loss of power on the inoperative engine and another cause which could have led to the detection of an indication of failure by highlighting a difference which is greater than a predetermined threshold.

Advantageously and according to the invention, said step of controlling an increase in the flow rate of fuel supply of said healthy engine consists in switching a law of anticipation of power, which links a measurement of the collective pitch of the blades of said helicopter to a speed setpoint value of said gas generator, in the twin-engine configuration to a law of anticipation in the single-engine configuration.

According to this variant, the increase in the fuel flow rate in the healthy engine consists in switching a law of anticipation of power in the twin-engine configuration to a law of anticipation in the single-engine configuration.

The invention also relates to a device for detecting a malfunction in a first turboshaft engine, referred to as an inoperative engine, of a twin-engine helicopter, and for controlling a second turboshaft engine, each engine comprising protective stops regulated by a regulation device which define a maximum power regime, said healthy engine comprising:

a module for detecting an indication of failure of said inoperative engine, a module for modifying said protective stops of said healthy engine into protective stops which correspond to a single-engine regime, in the case of the detected indication of failure, a module for confirming a failure of said inoperative engine, a module for controlling an increase in the flow rate of fuel supply of said healthy engine in the case of confirmed failure.

A device according to the invention advantageously implements a method according to the invention, and a method according to the invention is advantageously implemented by a device according to the invention.

Throughout the text, module denotes a software element, a sub-assembly of a software program, which can be compiled separately, either for independent use or to be assembled with other modules of a program, or a hardware element, or a combination of a hardware element and a software sub-program. A hardware element of this type can comprise an application-specific integrated circuit (better known by the abbreviation ASIC) or a programmable software circuit or any equivalent hardware. In a general manner, a module is thus a (software and/or hardware) element which makes it possible to ensure a function.

The invention also relates to a helicopter comprising at least two turboshaft engines, characterised in that it comprises a device according to the invention.

The invention also relates to a method for detecting a malfunction of a first turboshaft engine of a twin-engine helicopter, and for controlling a second turboshaft engine, to a corresponding device, and to a helicopter comprising such a device, characterised in combination by all or some of the features mentioned above or below.

5. LIST OF THE DRAWINGS

Figure 2:
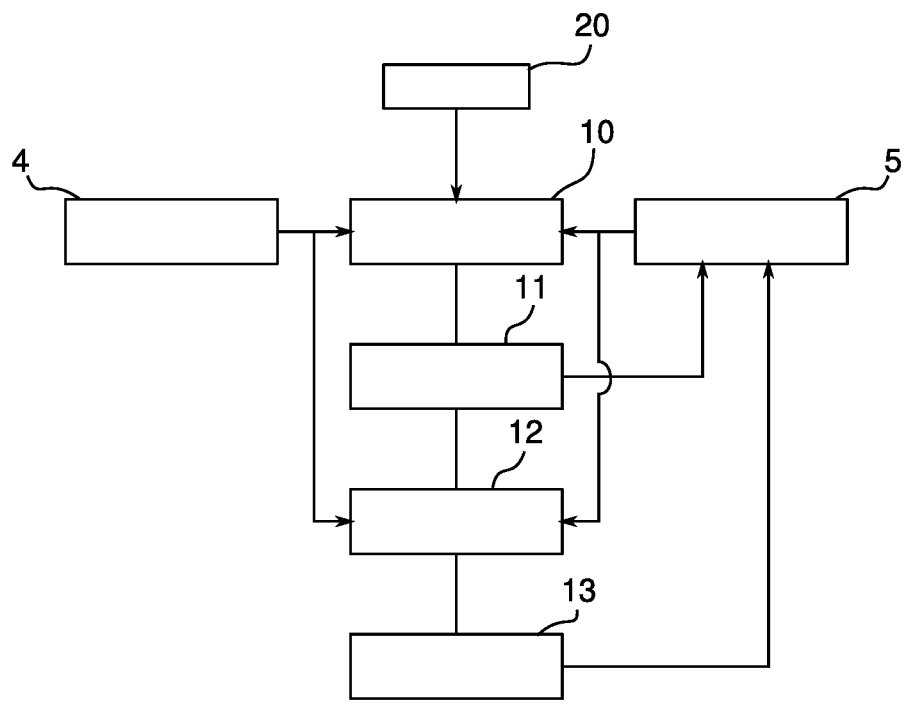

Other aims, features and advantages of the invention will become apparent from reading the following description which is provided purely on a non-limiting basis and relates to the appended figures, in which:

FIG. 1 is a schematic view of a twin-engine architecture for implementing the method according to one embodiment of the invention, FIG. 2 is a schematic view of a method according to one embodiment of the invention.

6. DETAILED DESCRIPTION OF AN EMBODIMENT OF THE INVENTION

FIG. 1 is a schematic view of an example of architecture 100 of a twin-engine helicopter which is adapted to the implementation of a method according to the invention. Each turboshaft engine 4, 5 comprises respectively and conventionally a gas generator 41, 51 and a free turbine 42, 52 which is supplied by the gas generator 41, 51 to provide power. The output of the turbine engines is connected to a power transmission case 9. Each gas generator 41, 51 further comprises a combustion chamber 40, 50 which is supplied with fuel by a fuel distribution circuit which is not shown in the drawing for the sake of clarity.

Each turboshaft engine 4, 5 is coupled to drive means E1, E2 and to emergency assistance devices U1, U2.

Each means E1, E2 for setting into rotation the respective gas generator 41, 51 can be formed by a starter which is powered respectively by a starter/generator device with which the other turbine engine is equipped.

The drive means E1, E2, the emergency assistance devices U1, U2 and the controls of the turbine engines 4, 5 are managed by a regulation device 8. This regulation device is adapted to regulate the protective stops which define the maximum power regime of each engine.

FIG. 2 is a schematic view of a method according to one embodiment of the invention. A method according to this embodiment of the invention comprises a step 10 of detecting an indication of failure of the first turboshaft engine 4, referred to as an inoperative engine, by measuring a difference which is greater than a predetermined threshold between values supplied by this inoperative turboshaft engine 4 and the healthy engine 5, for at least one parameter which is representative of the operating regime of the engines 4, 5.

Throughout the text, the terms "engine" and "turboshaft engine" are synonyms and are thus used to denote a device for supplying power for a helicopter. The blocks 4, 5 from FIG. 2 respectively show the inoperative turboshaft engine and the healthy turboshaft engine, including the power and control members. FIG. 2 is only intended to show the sequencing of the steps of the method and the main interactions with the two turboshaft engines.

The method further comprises a step 11 of modifying and increasing the protective stops of the healthy turboshaft engine 5 to protective steps which correspond to a full-power single-engine regime. This modification of the stops is carried out in the case of an indication of failure detected in step 10. These protective stops are the rotational speed of the gas generator, the torque on the output shaft and the temperature of the combustion chamber.

The method further comprises a step 12 of confirming the failure of the inoperative turboshaft engine 4 by measuring a difference which is greater than a predetermined threshold between the values supplied by this inoperative turboshaft engine 4 and the healthy turboshaft engine 5, for multiple parameters which are representative of the operating regime of the engines.

Lastly, the method comprises a step 13 of controlling an increase in the flow rate of fuel supply of the healthy turboshaft engine 5 in the case of confirmed failure.

Each step will now be described in greater detail.

The step 10 of detecting an indication of failure consists in retrieving, for each engine 4, 5, a measurement of at least one parameter which is representative of the operating regime of the engines and detecting a difference between said measurements which is greater, in terms of absolute value, than a predetermined threshold. This parameter is for example the rotational speed of the gas generator 41, 51 of each engine or the torque of the output shaft.

The measurement of the difference between the values is modulated by at least one modulation variable 20 which is representative of normal variations in the measurements during a nominal operating regime of the engines 4, 5. This variable 20 is for example representative of the type of engine regimes, of the type of effective balancing of the engines, of the proximity of the measurements of the shaft and torque speeds of the engines to the maximum permissible values for said engines, of the acceleration and deceleration rates of the engines or of the period of transmission of said measurements of each parameter which is representative of the operating regime of the engines.

In step 10 of detecting an index, the difference between the values supplied by the engines is thus calculated, then modulated by the modulation variable 20. If a difference greater than a predetermined threshold is detected, then an indication of failure of the engine 4 is detected.

For example, taking into consideration the rotational speed of the gas generator, and according to one embodiment, the predetermined threshold above which a difference is considered to be significant enough to characterise a failure, is 1%. Taking into consideration the engine torque, the predetermined threshold is fixed at 7%.

The step 11 thus consists in controlling the full power of the engine 5 in such a way that it reaches rated values of single-engine operation, in order to overcome the malfunction of the engine 4. Conventionally, this control is intended to increase the rotational speed of the gas turbine and the torque at the output of the turboshaft engine.

The step 12 consists in verifying that the engine 4 is in fact inoperative. For this purpose, the following tests are carried out. It is verified that a signed difference between the rotational speed of the gas generator 41 of the inoperative engine 4 and the rotational speed of the gas generator 51 of the healthy engine 5 is greater than the difference measured in the step 10 of detecting an index when the parameter which is representative of the operating regime of the engines is the rotational speed of the gas generators of the engines. It is also verified that the signed difference between the torque of the output shaft of the inoperative engine 4 and the torque of the output shaft of the healthy engine 5 is greater than the difference measured during the step of detecting an index when the parameter which is representative of the operating regime of the engines is the torque of the engines. It is also verified that the rotational speed of the free turbine 42 of the inoperative engine 4 is less than a predetermined setpoint value which is subtracted from a predetermined offset (for example said offset is fixed at 0.75% of the speed of the free turbine, and the setpoint value is the rated speed of the free turbine). It is also verified that the time derivative of the rotational speed of the gas generator 51 of the healthy engine 5 is greater than a predetermined threshold (for example, the predetermined threshold for the time derivative of the healthy engine is fixed at 1% of the speed of the gas generator per second). It is lastly verified that the time derivative of the rotational speed of the gas generator 41 of the inoperative engine 4 is less than a predetermined threshold (for example, the predetermined threshold for the time derivative of the inoperative engine is fixed at 5% of the speed of the gas generator per second).

If all of the above-mentioned conditions are verified, the failure of the engine 4 is confirmed, and a command going to the healthy engine 5 is initiated to increase the fuel flow rate of the healthy engine 5.

According to one embodiment, this increase in the fuel flow rate is obtained by switching a law of anticipation of power, which links a measurement of the collective pitch of the blades of the twin-engine helicopter to a speed setpoint value of the gas generator 51 in the twin-engine configuration to a law of anticipation in the single-engine configuration. This switching of laws of anticipation causes a jump in the setpoint of flow rate, suddenly accelerating the healthy engine 5 whilst guaranteeing the protections of the engine 5 (maximum speed, maximum torque, maximum temperature, no pumping, etc.).

A method according to the invention is advantageously implemented by a device for detecting a malfunction of the first, inoperative turboshaft engine of a twin-engine helicopter, and for controlling the second, healthy turboshaft engine comprising:
- a module for detecting an indication of failure of said inoperative engine,
- a module for modifying said protective stops of said healthy engine into protective stops which correspond to a single-engine regime, in the case of the detected indication of failure,
- a module for confirming a failure of said inoperative engine,
- a module for controlling an increase in the flow rate of fuel supply of said healthy engine in the case of confirmed failure.

According to one advantageous embodiment, this device is received in the regulation device 8, and this regulation device 8 is used as a detection module, as a module for modifying the stops, as a module for confirming failure, and as a control module.

According to one advantageous embodiment, the device comprises a computer program product which can be downloaded from a communication network and/or registered on a support which can be read by a computer and/or can be executed by a processor, comprising program code instructions for implementing the method according to the invention, when said program is executed on a computer. This computer program product is for example intended to be executed by the regulation device 8.

The invention claimed is:

1. A method for detecting a malfunction in a first turboshaft engine, referred to as an inoperative engine, of a twin-engine helicopter having a rotary wing, and for controlling a second turboshaft engine, referred to as a healthy engine, each engine comprising protective stops regulated by a regulation device which define a maximum power regime, comprising:

detecting an indication of failure of said inoperative engine, wherein said detecting, by a detection module, includes, retrieving, for each engine, at least one measurement of at least one parameter which is a representative of an operating regime of the engines, detecting a difference between said measurements which is greater, in terms of absolute value, than a first predetermined threshold, modifying said protective stops of said healthy engine, by an increase module, into protective stops which correspond to a maximum power single-engine regime, for the detected indication of failure, confirming, by a confirmation module, a failure of said inoperative engine, controlling, by a control module, an immediate increase in a flow rate of fuel supply of said healthy engine, in an event of a confirmed failure, so as to allow an acceleration of the healthy engine without waiting for an automatic regulation of the healthy engine after a decrease in speed of said rotary wing resulting from the confirmed failure of the inoperative engine, wherein each engine comprises a gas generator powering a free turbine which sets into rotation an output shaft, wherein the at least one parameter which is representative of the operating regime of each engine is a rotational speed of the gas generator of the respective engine or a torque exerted by the output shaft of the respective engine and said confirming includes verifying that multiple predetermined conditions which are representative of a real loss of power are verified wherein said predetermined conditions are as follows:

a first signed difference between the rotational speed of said gas generator of said inoperative engine and the rotational speed of said gas generator of said healthy engine is greater than the difference measured during detecting an index for the parameter which is representative of the operating regime of the engines, a second signed difference between the torque of said output shaft of said inoperative engine and the torque of said output shaft of said healthy engine is greater than the difference measured during detecting the index, a rotational speed of said free turbine of said inoperative engine is less than a predetermined setpoint value which is subtracted from a predetermined offset, a first time derivative of the rotational speed of said gas generator of said healthy engine is greater than a second predetermined threshold, a second time derivative of the rotational speed of said gas generator of said inoperative engine is less than a third predetermined threshold.

2. The method according to claim 1, wherein the detection of the difference between said measurements is modulated by at least one variable, referred to as a modulation variable, which is representative of normal variations in said measurements during a nominal operating regime of the engines.

3. The method according to claim 2, wherein the at least one modulation variable is selected from the following group: type of engine regimes; type of effective balancing of the engines; proximity of the measurements of the shaft and torque speeds of the engines to the maximum permissible values for said engines; acceleration and deceleration rates of the engines; period of transmission of said measurements of each parameter which is representative of the operating regime of the engines.

4. The method according to claim 2, further comprising learning nominal differences between said measurements of the at least one parameter which is representative of the operating regime of the engines, during stabilized regimes of said engines, said nominal differences which are determined in this way constituting the modulation variable.

5. The method according to claim 1, wherein each engine comprises a gas generator powering a free turbine which sets into rotation an output shaft, wherein the at least one parameter which is representative of the operating regime of each engine is a rotational speed of the gas generator of the respective engine or a torque exerted by the output shaft of the respective engine.

6. The method according to claim 5, wherein said modifying the protective stops of the healthy engine into stops corresponding to the single-engine regime includes increasing the torque exerted by the output shaft of the healthy engine and increasing the rotational speed of the gas generator of the healthy engine in order to achieve predetermined rated values corresponding to the maximum power single-engine regime.

7. The method according to claim 1, wherein said confirming the failure of said inoperative engine includes verifying that multiple predetermined conditions which are representative of a real loss of power are verified.

8. The method according to claim 1, wherein controlling the increase in the flow rate of fuel supply of said healthy engine includes a switching law of anticipation power, which links a measurement of the collective pitch of the blades of said helicopter to a speed setpoint value of the gas generator of the healthy engine, in a twin configuration to another law of anticipation in a single-engine configuration.

9. A device for detecting a malfunction in a first turboshaft engine, referred to as an inoperative engine, of a twin-engine helicopter having a rotary wing, and for controlling a second turboshaft engine, referred to as a healthy engine, each engine comprising protective stops regulated by a regulation device which define a maximum power regime, comprising:

a detection module for detecting an indication of failure of said inoperative engine, an increase module for increasing the protective stops of said healthy engine into stops which correspond to a single-engine regime, for the detected indication of failure, a confirmation module for confirming a failure of said inoperative engine, a control module for controlling an immediate increase in a flow rate of fuel supply of said healthy engine, in an event of a confirmed failure, so as to allow an acceleration of the healthy engine without waiting for an automatic regulation of the healthy engine after a decrease in speed of said rotary wing resulting from the confirmed failure of the inoperative engine, wherein the detection module is further configured to 1) retrieve, for each engine, at least one measurement of at least one parameter which is representative of an operating regime of the engines, and 2) detect a difference between said measurements which is greater, in terms of absolute value, than a first predetermined threshold, wherein each engine comprises a gas generator powering a free turbine which sets into rotation an output shaft, wherein the at least one parameter which is representative of the operating regime of each engine is a rotational speed of the gas generator of the respective engine or a torque exerted by the output shaft of the respective engine and the confirmation module is further configured to verify that multiple predetermined conditions which are representative of a real loss of power are verified, wherein said predetermined conditions are as follows:
a first signed difference between the rotational speed of said gas generator of said inoperative engine and the rotational speed of said gas generator of said healthy engine is greater than the difference measured during detecting an index for the parameter which is representative of the operating regime of the engines,
a second signed difference between the torque of said output shaft of said inoperative engine and the torque of said output shaft of said healthy engine is greater than the difference measured during detecting the index,
a rotational speed of said free turbine of said inoperative engine is less than a predetermined setpoint value which is subtracted from a predetermined offset,
a first time derivative of the rotational speed of said gas generator of said healthy engine is greater than a second predetermined threshold,
a second time derivative of the rotational speed of said gas generator of said inoperative engine is less than a third predetermined threshold.

10. A helicopter comprising at least two turboshaft engines, wherein the helicopter comprises a device according to claim 9.

\* \* \* \* \*